June 22, 1971 G. P. LARSON 3,586,624
WASTE DISPOSAL METHOD AND SYSTEM
Filed March 2, 1970 3 Sheets-Sheet 1
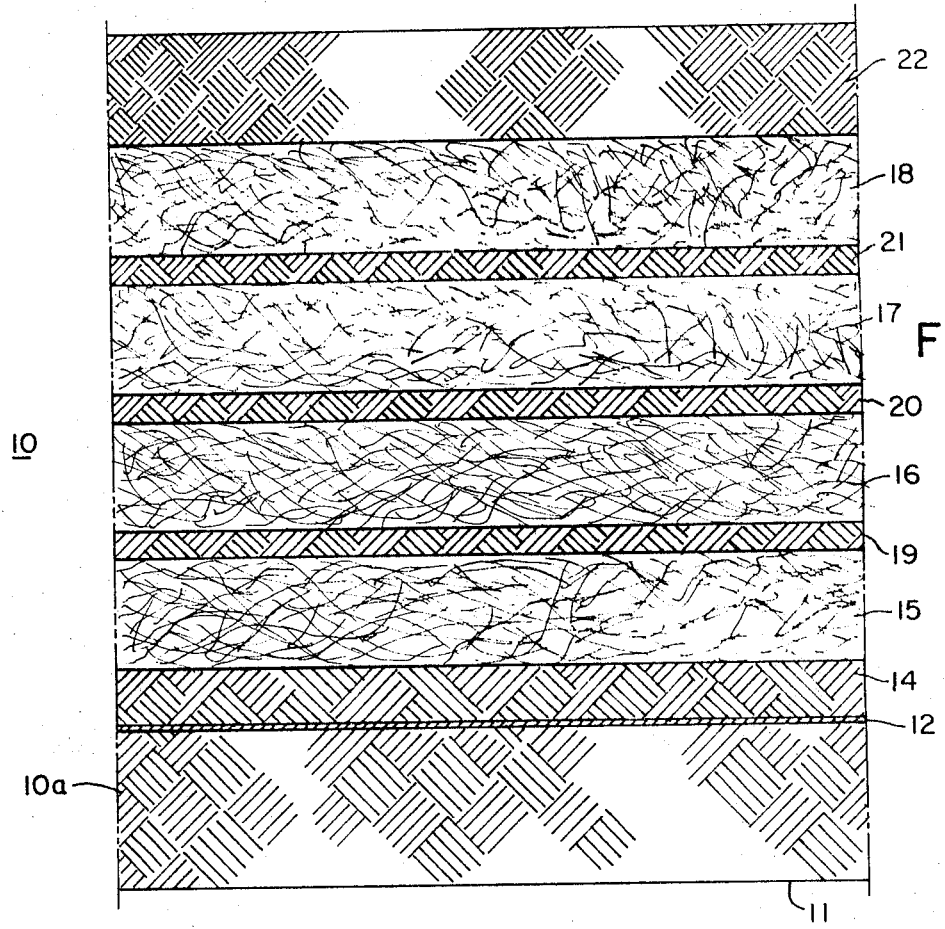
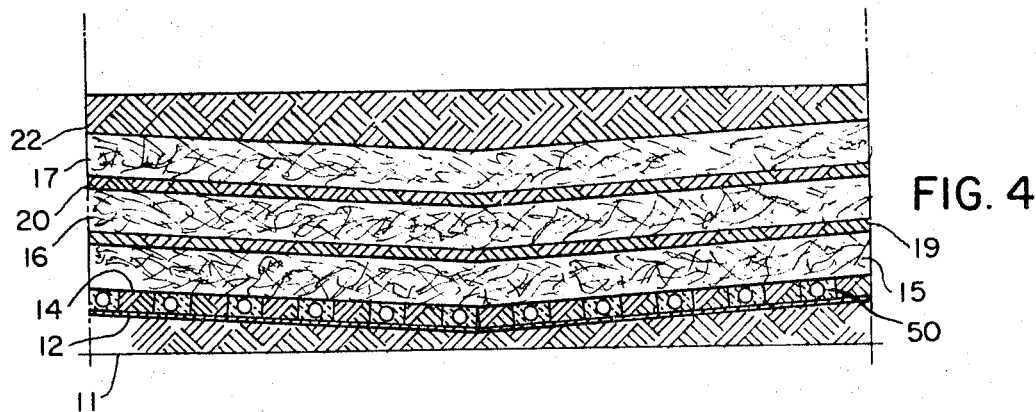
INVENTOR.
GORDON P. LARSON
BY
*Maleson, Kimmelman + Ratner*
ATTORNEYS.

June 22, 1971 G. P. LARSON 3,586,624
WASTE DISPOSAL METHOD AND SYSTEM
Filed March 2, 1970 3 Sheets-Sheet 2
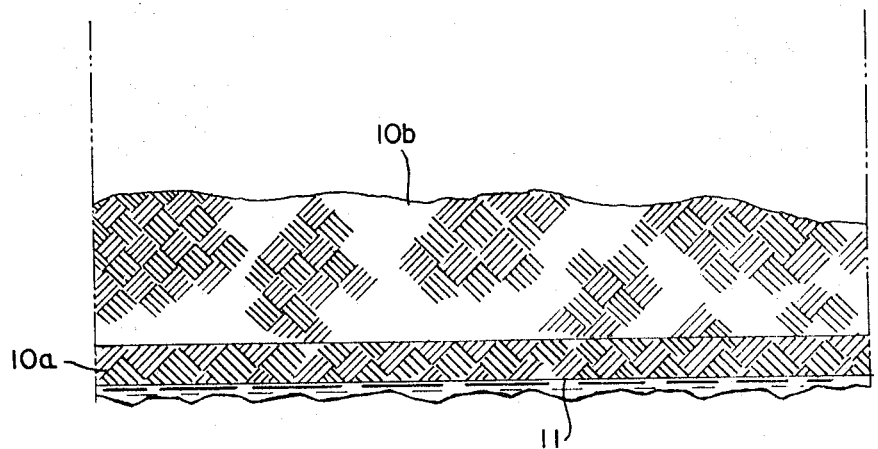
FIG. 2a
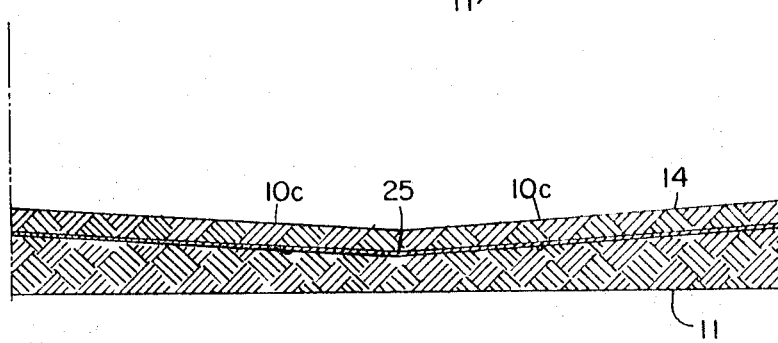
FIG. 2b
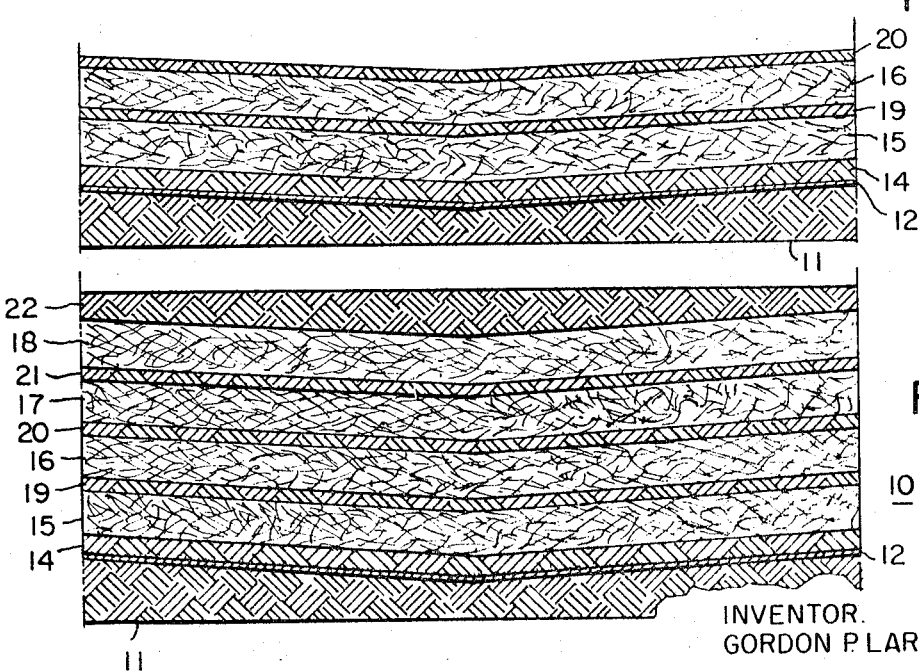
FIG. 2c
FIG. 2d
INVENTOR.
GORDON P. LARSON
BY
ATTORNEYS.

June 22, 1971 G. P. LARSON 3,586,624
WASTE DISPOSAL METHOD AND SYSTEM
Filed March 2, 1970 3 Sheets-Sheet 3

INVENTOR.
GORDON P. LARSON
BY
*Mason, Kennemelsen & Ratner*
ATTORNEYS.

United States Patent Office 3,586,624
Patented June 22, 1971

3,586,624
WASTE DISPOSAL METHOD AND SYSTEM
Gordon P. Larson, Malvern, Pa., assignor to Warner Company, Philadelphia, Pa.
Filed Mar. 2, 1970, Ser. No. 23,331
Int. Cl. C02c 5/10
U.S. Cl. 210—3
27 Claims

ABSTRACT OF THE DISCLOSURE

A landfill in which an earth sub-base is formed in a land area and the sub-base is covered with a liquid impervious layer. All of the solid waste fill in successive layers is placed on the impervious layer. Water flowing through the landfill becomes contaminated by the solid waste, is collected by the impervious layers and is then drained off the landfill and treated. The treated water and if not available, water from an external source, is distributed on the landfill which together with natural precipitation produces substantially continuous flow of water through the landfill thereby to accelerate the decomposition reaction of the solid waste.

BACKGROUND OF THE INVENTION (A) Field of the invention

This invention relates to the field of art of sanitary landfills.

(B) Prior art

It has become quite well known to use a sanitary landfill formed by filling a land area with successive layers of solid waste (principally household rubbish) and covering each layer with a layer of earth or soil. In general, the purpose of the soil cover layer is to contain the material from wind, from the intrusion of rodents and to reduce odors. Additionally, the earth layer provides a structurally sound area which may subsequently be used for parks, recreation areas or in some instances, light buildings.

The raw materials of the solid waste are usually from a rubbish collection system of a municipality and comprise glass, plastic, paper, aluminum and iron cans with varying proportions of organic material from foods and from kitchens. When this pile of mixed solid waste and earth have been placed in the land area, the resultant landfill pile becomes an effective chemical factory which results in a decomposition reaction of materials in both a biochemical and chemical manner. For example, the carbon and metal compounds are oxidized, the paper reacted on by microorganisms and the decomposition reaction produces gases, carbon dioxide, water, and methane depending on the carbon and oxygen conditions within the landfill.

The conventional landfill is uncontrolled and depends upon natural precipitation and climate to effect decomposition. If adequate oxygen is present, the decomposition reaction is aerobic and proceeds at a rapid rate. Various areas of the landfill pile, depending upon the depth thereof, will be deficient in oxygen and thus, the decomposition reaction will take place at a slower rate and, being anaerobic will produce methane which filters out into the atmosphere. Thus the conventional landfill develops large quantities of methane gas over an extended period of years which represents an explosion or fire hazard if the land is used for buildings prior to the complete stabilization of the landfilll.

Natural precipitation falling into the landfill pile over a period of time passes into the mass of the pile and creates a saturated condition. The water which contains oxygen aides in the decomposition of the solid waste. When the pile has become saturated any further precipitation will pass through and drain out of the landfill carrying with it metals, alkaline, acid and organic materials. In addition, this water will havè given up or exhausted all of its oxygen. Accordingly, the conventional landfill produces a highly toxic contaminated water which acts as a pollutant to underground water supplies, surface streams and wells. With a high ground water table, such contaminated water is particularly objectionable since it discharges into the ground water with little filtering by the soil. Another hazard which occurs with a high ground water table is that the ground water, by osmosis, may rise up from the water table into the landfill. In this manner, the ground water intrudes through the landfill and returns to pollute the water table.

A further hazard in an uncontrolled landfill is spontaneous combustion igniting the methane gas and causing underground fires which may smolder for years and are extremely difficult to extinguish. When cracks develop the dry materials in the landfill pile may be ignited as a result of the high temperatures produced underground in the decomposition reaction.

Another problem is that the site of the uncontrolled landfill is not reusable for an extended period of time for any purpose and thus represents a waste of resources. Since the competition for land in big cities is so great, the loss of land in this manner almost precludes any extensive use of land for the purpose of burying waste materials.

To prevent methane from flowing up and also to repel vermin, it has been known to cover each successive layer of waste material by an impervious layer such as asphalt or a plastic material. However, an impervious layer does not prevent the generation of methane which must seep out or an explosion may result. In addition, the impervious layer has not solved the other problems described above such as expediting the stabilization of the reaction or preventing contamination of underground water supplies.

SUMMARY OF THE INVENTION

A landfill system has an earth sub-base for receiving solid waste fill and a liquid impervious layer is disposed between the sub-base and all the solid waste fill. The liquid impervious layer is configured for collecting water which has been contaminated by the waste fill. It is in this manner that the contaminated water is prevented from discharging into the ground or surface waters and the ground water is prevented from rising up and intruding into the landfill.

Further in accordance with the invention, the contaminated water is collected and drained off from the landfill and then treated to form treated water. The treated water is distributed on the landfill. However, if no treated water is available, an external source of water is used to provide, together with natural precipitation, a substantially continuous flow of water through the landfill. Thus, the decomposition reaction is accelerated, the fire hazard is decreased, the flushing action of the contaminants is on a continuous basis and the early stabilization of the landfill is promoted.

BRIEF DESCRIPTION OF THE DRAWINGS

FIG. 1 is a vertical longitudinal section of a portion of the landfill embodying the present invention;

FIGS. 2a–d are vertical longitudinal sections of a landfill section showing step by step the method of making the landfill.

FIG. 4 is a vertical longitudinal section of a portion of the landfill including tile grating.

Referring now to FIG. 1 there is shown a portion of a completed section of a landfill pile 10 comprising a liquid impervious asphalt membrane 12 which is placed on earth sub-base 10a above and substantially close to the underground water table 11. Above and resting on membrane 12 is a soil layer 14. Over soil layer 14, is first layer of solid waste material 15 covered by a layer of soil 19 followed by successive waste fill layers 16 and 17 covered by soil layers 20 and 21 respectively. The last or fourth layer of waste fill 18 is covered by a cover soil layer 22.

Figure 3:
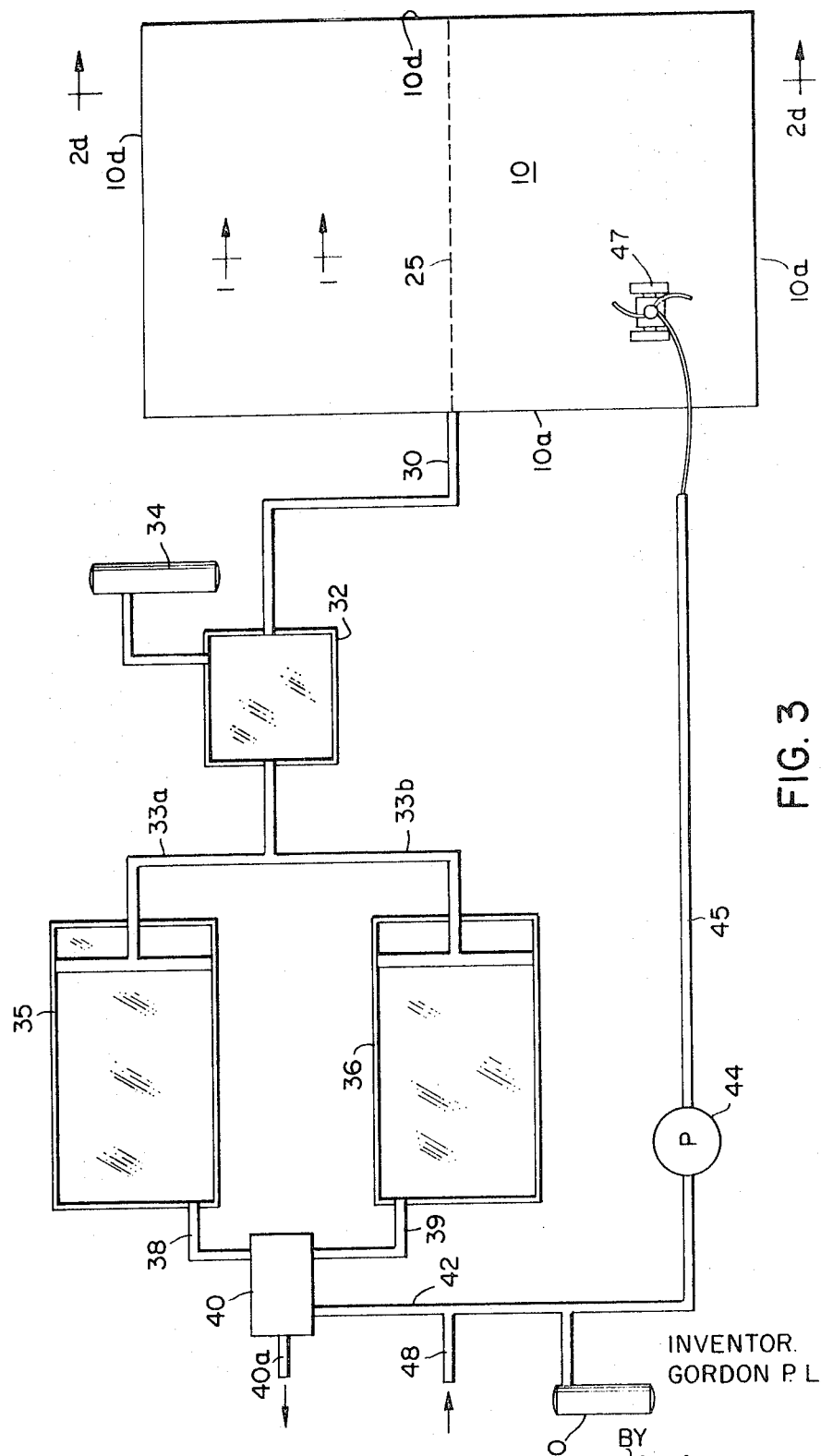
FIG. 3 is a top view of the landfill, contaminated water treatment areas and water distribution system.

The method of forming landfill section 10 of FIG. 1 is shown in an accelerated step by step manner illustrated in FIGS. 2a–d. In this initial step, soil 10b is excavated to prepare a sub-base 10a with a proper slope as shown in FIG. 2b. The excavated soil 10b may be used for the soil layers 14, 19–22. In a typical excavation, sub-base 10a may be at least one foot above underground water table 11 with a three foot soil cover being preferable. The excavated sub-base is graded with the proper slope to a common collection point. Any rough surfaces are dragged and rolled to remove sharp uneven surfaces and, in addition, large rocks are removed. In this manner, a drainage channel is formed in which the sides 10c of the sub-base 10a are graded downwardly from the outer edges 10d, FIG. 3 and then membrane 12 is placed on the graded sub-base 10a. Membrane 12 thus has a grade or slope to form a single common collection or drainage channel 25.

It will be understood that landfill section 10 may, in typical example, be from one to ten acres. For large landfills, depending on the elevation of drainage and topography, it may be desirable to form several sections adjoining one another with each section having its own drainage channel 25.

It will further be understood that sub-base 10a, soil 10b excavated therefrom and layers 14, 19–22 may be any type of earth. Earth, for these purposes, is defined as any particulate ground material such as soil, sandy soil, sand, gravel, humus, silt and any combination thereof.

After sub-base 10a has been prepared, an asphalt membrane 12 is formed by the application of a relatively hard high-viscosity, high-softening point asphalt usually without filler or aggregate. Membrane 12 may be, for example, about ¼ inch thick and provides a continuous liquid proof seal. The membrane is placed by a conventional asphalt distributor in which the spray bar is offset to one side. The heated asphalt is sprayed on the prepared sub-base 10a in two coats over the entire bottom and interior side slopes of the land area. Asphalt membranes are well known and are described for example in Asphalt Linings for Waste Ponds, The asphalt Institute, College Park, Md., Information Series No. 136, August 1966.

By the use of a properly configured liquid impervious membrane 12 between sub-base 10a and all the lowermost portions of first waste fill layer 15, the contaminated water from landfill pile 10 is collected and prevented from flowing below the landfill or into surfare waters. In this manner, the contaminated water is unable to discharge into underground water table 11 and act as a pollutant therein. In addition, the liquid impervious membrane does not allow the ground water by osmosis from rising up from the water table into the landfill.

Membrane 12 is covered by a layer of soil 14 with the earth moving machinery pushing the dirt from the sides so that the machinery itself does not come in contact with the membrane. In operation the earth moving machinery places an initial track of soil over membrane 12 and then from that initial track pushes the soil to increase the width of the track until a complete soil layer 14 is formed. The minimum depth of soil layer 14 is a function of the weight of the earth moving machinery since the layer has the effect of spreading the weight of the machinery to avoid overloading the membrane and depressing or cracking it. In a typical example, a minimum of a twelve inch layer of soil 14 is required to prevent overloading membrane 12.

Another important purpose of soil layer 14 is to permit contaminated water that is accumulated to flow along it to be collected by the membrane. Soil layer 14 also provides a channel to allow the contaminated water to flow through the layer horizontally to drainage channel 25. It is in this manner that water is collected in channel 25 not only by flow along membrane 12 but also through soil layer 14. Accordingly, soil layer 14 is required to be of a porous nature and thus must be substantially free of silt and clay. As for example, layer 14 may preferably be less than 10 percent by weight of the combination of silt and clay.

As the contaminated water flows through soil layer 14 the layer is effective to screen out some of the sediment in the contaminated water. However, over a period of time such sedimentation may tend to plug up portions of the layer 14. Such plugging up may be avoided by increasing the depth of layer 14 with the resultant depth of layer 14 being dependent on the number of layers of waste fill.

A first layer of waste fill 15 is pushed into place over soil layer 14 and compacted. Over the first waste fill layer a layer of soil 19 of about six inches, for example, is pushed into place by the earth moving equipment and then alternate layers of fill and soil are pushed into place. To allow unimpeded flow of water through the landfill, soil layers 19–22 may be of the same character as that of the first soil layer 14. To form the last layer of the landfill pile 10, a layer of soil 22 of two foot depth, for example, is pushed into place and is graded to form the top layer. In a typical landfill each layer of waste fill may be compacted to a depth of from one to three feet.

The first waste fill layer 15 may be put down over a series of days over a ten acre land fill, as for example. However, no drainage occurs until all of the soil layers and waste fill layers have been entirely saturated by water from precipitation or by artificial means. The speed of saturation is dependent on the amount of precipitation and the speed in which the unsaturated layers are placed. After saturation, any further moisture produces drainage to be collected by the membrane and the first soil layer. It will be understood that after a first waste fill layer has been placed, it may become saturated. When the next layer is placed, there will be no drainage until both of the waste fill layers and soil layers in place have been fully saturated. After that, the further moisture is collected.

The foregoing process of alternating waste fill layers and soil layers is repeated depending on the desired height of the landfill pile 10.

In many different parts of the world there is an annual average of rainfall of water or melted snow in excess of that which would be evaporated. It is that excess of water that is available to penetrate or percolate through the landfill. For example, in the Eastern United States there is an annual average of rainfall of 15 inches of water in excess of that which would be evaporated. Thus, 15 inches of water penetrates landfill pile 10. It will be understood that this excess water arrives at irregular internals depending on rainfall conditions. Accordingly, the contaminated water flowing out of the saturated landfill and through channel 25 may vary from large amounts during heavy rains to zero during dry periods.

The contaminated water collected by drainage channel 25 of landfill section 10 exits by gravity flow from the landfill through a conduit or pipe 30 and is conveyed to a settling lagoon 32 of conventional type. If more than one landfill section is provided, the drainage channels may be connected, for example, to a common collection basin (not shown) and from that basin the contaminated water is conveyed to lagoon 32. A chemical dispenser 34 adds lime to settling lagoon 32 in order to precipitate the metals and other suspended solids in the contaminated water. The contaminated water is maintained in the settling lagoon for a sufficient time in order to clarify the water. The contaminated water is then directed by way of pipes 33a–b to a pair of parallel operated stabilization lagoons or oxidation ponds 35 and 36 respectively. It will be understood that one or more of these lagoons may be used in accordance with climatic conditions and calculated flow from landfill 10. As well known in the art, the lagoons are shallow ponds which provide for oxidation reaction of the contaminated water which takes place through aeration and sunlight. This reaction restores oxygen to the water to reduce the carbon oxygen demand (commonly called COD) or the biological oxygen demand (commonly called BOD).

The water that has been treated in lagoons 35 and 36 flows as "treated water" by way of pipes or conduits 38 and 39 to a common retention basin 40. During periods of high flow from stabilization lagoons 35 and 36, the storage capacity of basin 40 may be exceeded and thus a discharge 40a to a surrounding stream or waterway is provided for such conditions. It will be understood that such discharged treated water has been conditioned by the removal of metals, solids, COD or BOD contaminants to the degree required by local or Federal regulations. During periods of low or no precipitation with no flow of contaminated water from the landfill the treated water available in basin 40 is pumped through conduit 42 by a pump 44, and then through conduit 45 to a moveable sprayer 47. Sprayer 47 is effective to distribute the treated water from basin 40 over the top layer then in place on landfill 10.

During periods of low or no precipitation with no flow of contaminated water from the landfill, there may not be any substantial quantity of treated water available in basin 40. Thus, an external source of water may be taken from a stream, for example, for distribution to the landfill. The reason for no treated water being available may be, for example, that the landfill has not as yet become saturated and there has been no flow at all from the landfill. The external source provides flow of water into an inlet 48 and through conduit 42, pump 44, conduit 45 and then to sprayer 47. Whether the source to sprayer 47 is from basin 40 or from inlet 48, the water is treated with an acid chemical from a chemical dispenser 50 connected to conduit 42. Any acidic chemical compound may be used, such as dilute sulphuric acid, to provide the sprayed water with a pH of at least 5 and less than 7. Acidic water accelerates the decomposition of the metals in the landfill. In addition, the water having an oxygen content, maintains the microorganism colony of the landfill and provides oxygen for the decomposition of the paper, metal and organic materials as previously described.

In the control of the landfill, water is distributed on the landfill by sprayer 47 during periods of low or no natural precipitation when the flow of contaminated water into pipe 30 substantially ceases. At that time, there is provided the foregoing recirculation of treated water or circulation of added water. Accordingly, with the combination of natural precipitation and distributed water, there is provided a substantially continuous flow of water through the landfill. In this manner, the landfill once it has been entirely saturated, is maintained saturated at all times to produce an optimum condition for biochemical and chemical reaction to accelerate the decomposition reaction. In addition, the continuous water flow provides a flushing action of the contaminants on a continuous basis; the resultant contaminated water being collected and treated.

The continuous water flow through the saturated landfill is maintained until the landfill pile has become stabilized. In this way, the continuous water flow through the saturated landfill promotes the early stabilization of the landfill to provide as an end result, an inert mass. Thus, the land taken by the landfill is made reusable for building or for further solid waste disposal in a much shorter period of time as compared to prior landfills.

Additional advantages of continuous water flow through the saturated landfill pile are a substantial reduction in fire hazard and as a result of the greater quantity of oxygen within the system, substantial reduction in the generation of methane gas.

With the contaminated water collected from pile 10 being contained, the waste disposal system may be monitored in a conventional manner to determine when the landfill has ceased decomposition and degradation and no longer produces contaminants in the water. The landfill can then be called stabilized and inert.

Thus, in accordance with the invention, the landfill pile once entirely saturated is maintained saturated at all times without being dependent on weather conditions. In addition to keeping the pile saturated, the condition of the water returned to landfill is controlled so that it supplies oxygen and an acidic condition which continues to aid in the biochemical and chemical decomposition reaction.

As water penetrates the landfill, it may lose its oxygen when it reaches the lower waste fill layers. Accordingly, the lower layers such as layers 15 and 16 may remain deficient in oxygen. In order to increase the oxygen level of these lower levels, air may be circulated through these lower layers in a manner illustrated in FIG. 4. In FIG. 4, a layer of hollow tile grating 50 is provided within the soil layer 14 as illustrated or as a layer disposed above the layer 14. In this manner grating 50 is between all of the waste fill and membrane 12. This tile grating 50 is of conventional construction with noncemented joints and extends to the edges 10d of landfill 10. Thus, air penetrates from the atmosphere at the edges of the landfill, flows through the grating and up into the bottom layer 15 of waste fill. This air distribution may also be achieved by layers of other similar materials such as pipes and grates. Instead of circulating air, for its oxygen content, pure oxygen may be circulated through the grating.

While the invention has been described with particular reference to the drawings, it will be understood that various changes may be made. For example, while asphalt membranes have advantages in ease of construction and low cost, it will be understood that other liquid impervious layers of conventional type may be used. For example, membranes of rubber, polyethylene and clay may be used. In addition, a membrane made of waste materials such as fly ash mixed with lime and cement may be used to form a water impervious barrier. However, a material should not be used which tends to add mineral or solid contaminants to the contaminated water being collected.

Other methods of distributing the water over the landfill may be provided such as watering pipes and irrigation ditches used on a farm.

What is claimed is:

1. A landfill system comprising
   an earth sub-base,
   a solid waste fill supported by and on top of said sub-base, and
   a liquid impervious layer between said sub-base and all the lowermost portion of said waste fill, said impervious layer being configured for collecting water which is contaminated by the waste fill thereby to prevent (1) said contaminated water from discharging into ground or surface waters and (2) said ground water from rising up and intruding into said landfill.

2. The landfill system of claim 1 in which there is provided a layer of earth between said liquid impervious layer and said lowermost waste fill portion for free flow of said contaminated water.

3. The landfill system of claim 1 in which said solid waste fill is placed in successive layers and in which each solid waste fill layer is covered by a layer of earth.

4. The landfill system of claim 1 in which said liquid impervious layer has a slope forming at least one drainage channel for draining said collected contaminated water.

5. The landfill system of claim 4 in which there is provided a layer of soil between said liquid impervious layer and said lowermost waste fill portion and resting on said liquid impervious layer of depth to allow for free flow of said contaminated water to said drainage channel.

6. The landfill system of claim 4 in which there is provided means for conveying said contaminated water from said drainage channel, and treating means in fluid connection with said conveying means for treating said contaminated water to form treated water.

7. The landfill system of claim 6 in which there is provided means for distributing said treated water over said landfill which together with natural precipitation provides a substantially continuous flow of water through the landfill.

8. The landfill system of claim 7 in which there is provided an external source of water for providing a supply of water to said distributing means when there is no treated water available.

9. The landfill system of claim 8 in which there is provided means for acidifying all of the water flowing from the distributing means over said landfill.

10. The landfill system of claim 2 in which there is provided air distributing means in contact with said earth layer and the atmosphere for circulating oxygen from the atmosphere into said waste fill.

11. A method of making a landfill comprising the steps of forming an earth sub-base in a land area, covering the sub-base with a liquid impervious layer, placing all the solid waste fill for the landfill on the impervious layer, and configuring the impervious layer for collecting water which has been contaminated by the waste fill thereby to prevent (1) said contaminated water from discharging into ground or surface waters and (2) said ground water from rising up into the landfill.

12. The method of claim 11 including the further step of covering the liquid impervious layer with a layer of earth and then performing the step of placing all the solid waste fill for the landfill on the layer of earth.

13. The method of claim 11 including the further step of providing said liquid impervious layer with a slope forming at least one channel for draining said collected contaminated water.

14. The method of claim 11 including the further step of grading said sub-base with a predetermined slope before covering with the liquid impervious layer forming on the layer at least one drainage channel.

15. The method of claim 13 including the further step of conveying said drained contaminated water off of the landfill.

16. The method of claim 15 including the further step of treating the contaminated water to remove the contaminants therefrom to form treated water.

17. The method of claim 16 including the further step of distributing the treated water on the landfill when the flow of contaminated water being drained off substantially ceases.

18. The method of claim 17 including the further step of distributing water on the landfill from an external supply in the absence of treated water thereby providing in combination with natural precipitation a substantially continuous flow of water through the landfill for saturating and maintaining saturated the landfill.

19. The method of claim 18 including the further step of acidifying all of the water before being distributed on the landfill.

20. The method of claim 11 including the further step of placing successive layers of waste fill on the impervious layer and covering each successive waste fill layer with a layer of earth.

21. The method of claim 11 including the further step of circulating oxygen from the atmosphere to the lower portions of the waste fill.

22. The method of claim 18 in which the further step of distributing the water and maintaining the substantially continuous water flow is continued until the landfill is substantially stabilized and inert.

23. The method of claim 18 including the further step of spraying the treated water and the water from the external source over the top of the landfill.

24. The method of claim 17 in which the treating step includes the step of restoring oxygen in the contaminated water.

25. The method of claim 11 including the further step of distributing water on the landfill in addition to natural precipitation.

26. The method of claim 25 including the further step of maintaining a substantially continuous flow of water through the landfill for saturating and maintaining saturated the landfill.

27. The method of claim 11 including the further steps of conveying said contaminated water off of the landfill, treating the contaminated water, and applying the treated water to the landfill.

References Cited

UNITED STATES PATENTS

| 1,935,090 | 11/1933 | Holland | 61—35 |
| 3,336,755 | 8/1967 | Renfro | 61—11 |
| 3,337,989 | 8/1967 | Harmon | 210—59X |
| 3,394,551 | 7/1968 | Thompson et al. | 61—13X |
| 3,461,675 | 10/1969 | Izatt | 61—11 |

MICHAEL ROGERS, Primary Examiner

U.S. Cl. X.R.

61—11, 35; 210—15, 18, 195